United States Patent Office 2,993,868
Patented July 25, 1961

2,993,868
HYDROTREATING CATALYST
James E. McEvoy, Morton, Pa., assignor to Houdry Process Corporation, Wilmington, Del., a corporation of Delaware
No Drawing. Filed May 1, 1958, Ser. No. 732,118
6 Claims. (Cl. 252—465)

This invention relates to catalyst for processing various hydrocarbons or hydrocarbon mixtures. More particularly, the invention relates to a new and improved method of preparing catalysts of the type comprising multiple active ingredients particularly effective in the hydrotreating, e.g., hydrodesulfurization, of organic materials such as petroleum fractions, distillates, and the like.

As is well known, methods of hydrotreating to effect desulfurization and/or nitrogen removal are rather widely used in the petroleum refining industry to improve petroleum stocks. This is particularly true because of the increasing use of stocks naturally containing higher quantities of sulfur and/or nitrogen compounds. Such stocks include crudes from such places as California, West Texas and the Middle East. Increased use of hydrotreating methods in the refining industry has become more feasible because of the lower relative cost of hydrogen, improvements in equipment and improvements in processing through improved catalysts.

A new and improved method has now been found for the preparation of a catalyst emmiently suited for use in hydrostreating operations and related refining operations in which such catalysts may be employed. Catalysts prepared by this new method not only have improved catalytic activity but have, in addition, certain physical characteristics which contribute to the utility and activity. Such catalysts have advantages including higher activity, longer useful life, lower bulk density and practical advantages stemming from simplified preparation.

According to this invention, improved hydrotreating catalysts comprising oxides of cobalt and molybdenum in association with alumina are prepared by the method which includes thoroughly admixing alumina hydrate particles with a basic aqueous solution comprising complexed molybdenum and cobalt in the highest valence state to form a basic extrudable paste. The alumina hydrate essential to this invention comprises a mixture of alumina in two stages of hydration, namely: alpha alumina monohydrate in an amount of about 25–75% by weight of the alumina hydrate and beta alumina trihydrate is an amount of about 75–25% of the alumina hydrate. Such extrudable mixture is extruded into strands, rods, ribbons or the like which are divided into suitably sized particles, dried and calcined to high surface area, active catalyst of low bulk density.

The aluminaceous material is a controlling factor in the success of catalyst prepared according to this invention. As is well known in catalyst comprising an aluminaceous support, the physical characteristics of the alumina and/or the alumina precursor affect the nature of the strength and activity of the final catalyst as well as the methods of compositing, forming, shaping, or admixing of the various final catalyst.

An essential feature of this invention resides in the use of a special combination of particular forms of hydrated alumina. Such aluminas, identified above as the alpha alumina monohydrate and the beta alumina trihydrate, in the called-for combination result in the superior catalyst of this invention, whereas, either form of hydrated alumina by itself lacks one or more essential characteristics as evidenced in catalyst preparation therefrom as having short-comings which place them in a category below those obtained through the practice of this invention.

For example, beta alumina trihydrate has a relatively low surface area such as less than about 30 square meters per gram and the use thereof results in a catalyst having neither satisfactory distribution nor concentration of the cobalt and molybdenum additives because the lack of adsorptive properties is such that a sufficient amount of aqueous basic solution having the required content of such additives is insufficiently and inadequately associated with such beta alumina trihydrate. Among other disadvantages is the fact that an admixture of the beta alumina trihydrate with an aqueous basic solution results in a paste for material which may be adjusted to extrudability, but which, on extrusion, does not result in the formation of a material having desired and required physical characteristics necessary for strong active catalyst particles.

Likewise, it is further to be observed that alpha alumina monohydrate has the distinct drawback of failing to produce particles having the desired physical characteristics and strength necessary for commercial use. In fact, it is generally recognized that alumina hydrates, generally, are not particularly suited to extrusion methods in that the extrudable paste appears to be deficient in required cohesiveness necessary to the production of a sturdy, non-crumbling catalyst particle. Therefore, it is an interesting and valuable discovery that an admixture in the described range of the alpha alumina monohydrate and the beta alumina trihydrate, at least in conjunction with the admixed basic solution of the molybdenum and cobalt salts, gives an extrudable paste which is capable of formation of a sturdy non-crumbling catalyst particle further characterized by the desirable high activity.

Likewise, it is to be understood that completely or substantially completely dehydrated alumina, which encompasses the well-known "activated alumina" of commerce, fails to meet the high standards of activity now possible through the practice of this invention.

It has been found, for exmaple, that even starting with beta alumina trihydrate, effecting complete dehydration and thereafter, admixing, extruding, drying and calcining as herein practiced, the final catalyst material shows substantially no improvement over previously available similar materials. Catalysts prepared in this manner from the fully dehydrated alumina may have a surface area as high as about 200–250 square meters per gram. The sustained activity of such catalysts in use falls considerably below that of catalysts prepared from partly hydrated aluminas in accordance with the invention.

Thus, catalyst prepared in accordance with the present invention, using alpha alumina monohydrate and beta alumina trihydrate in the proper range of mixture, results in catalysts having such desired features as high surface area capable of retaining desired quantities of active metal components. Moreover, these can be advantageously prepared by a simple and single admixing operation obtaining an aggregate composite of high physical strength and low bulk density. More importantly, however, these catalysts demonstrate uniquely high activity over prolonged periods of use in desulfurization and nitrogen removal from hydrocarbons.

Past experience has shown that catalyst compositions comprising 1–4% CoO, 8–20% $MoO_3$ and 76–91% alumina have exhibited the best activities and stability for the typical uses. The composition of the catalyst of the present invention is in accord with these findings and further exhibits these beneficial aspects when the preparation includes what appears to be a complexing situation involving all of the components as opposed to catalyst types prepared from simple admixture, even in the suggested range of concentrations of CoO, $MoO_3$ and $Al_2O_3$. One other feature appearing to have some importance is that of a low sodium oxide content, preferably less than 0.1% by weight of the total catalyst. It is to be noted, however, that the full effects of the sodium concentration of the final catalyst are neither definitely known nor fully understood and that the amount of sodium oxide in these catalysts is not part of the invention.

The basic aqueous solution of cobalt and molybdenum salts properly contains the amount of cobalt and molybdenum which will give the desired and required amount of cobalt oxide and molybdenum oxide (or the sulfides or other forms as may be required) in the final catalyst. The preparation of such complexed solutions is described in the Donovan et al. patent, U.S. 2,755,257; with the exception that in the present method the cobalt-containing salt is maintained in the three-valent form by the addition in the solution of a suitable oxidizing agent such as hydrogen peroxide. Another improvement is flexibility in the solution preparation in that ammonium hydroxide may substitute for part or all of the ethylene diamine; keeping the pH in the range of 7.5 to 9.5, preferably between about 8.5 and 9. The molybdenum salt, likewise, in admixture with the cobalt salt is maintained in an oxidized form and both of these materials are found to be soluble in a reasonably wide range of solubilities and stable in solution under all normal conditions. The preparation and extrusion of an extrudable mix follows the pattern well known to the art, and a wide range of methods and conditions may be employed to secure a well formed final pelleted material.

Generally the cobalt and molybdenum components may be prepared for incorporation in the catalyst by procedure somewhat as described below; however, other methods of associating these components in solution form for admixture with the partially dehydrated alumina, i.e., the combination of alpha alumina monohydrate and beta alumina trihydrate, for development of the total mix into an extrudable form are within the considerations of this invention. For example, a cobaltous salt such as the nitrate, or formate, or acetate, or other is complexed with ethylenediamine to form a Werner-type complex, such as represented in $[Co(en)_3]^{++}$. The solubility of the cobalt complex is greater and more stable in solution in a higher valence state and the above complex is converted to the form $[Co(en)_3]^{+++}$ by oxidative treatment, such as with hydrogen peroxide, air or other oxidizing agent which will not add to the complex or solution objectionable or detrimental components. Other complex forms may be possible and the controlling factor is that the cobalt-containing complex is in the highest valence, i.e., trivalent, state.

The molybdenum component is preferably obtained from ammonium molybdate prepared, for example, by dissolving pure $MoO_3$ in ammonium hydroxide. The cobaltic complex and the ammonium molybdate in common solution are then ready for admixture with the partially dehydrated alumina. It is to be understood that the proportions of the several components determine and, therefore, depend on the desired final composition of the catalyst. Admixture of the components may be effected by cogrinding, mulling, stirring or the like and during such admixture the consistency of the mix may be adjusted in moisture content such that an extrudable mix is formed. Generally, the moisture content will be in the range of about 25 to 45% by weight of the mixture, and preferably is in the range of 30 to 40% by weight.

In conventional preparation, alumina in the form of pellets, granules, or the like is impregnated by the previously available methods in one or more steps with solutions of cobalt-molybdenum salts, followed by calcining. Or the preparation might follow the procedure in which hydrated alumina, with or without one of the ingredients such as the molybdena, is admixed with an acid and peptized, and then formed into pellets which are thereafter impregnated with one or more of the additives. In the present improved procedure, multiple impregnation is avoided, admixture of ingredients is combined with preparation for extrusion, special treatment of the alumina hydrate is unnecessary and, as illustrated below, the product catalyst has superior qualities of activity and physical characteristics of surprising merit.

EXAMPLE I

A cobalt oxide-molybdenum oxide-aluminum oxide catalyst was prepared as follows.

A solution of ammonium molybdate was prepared by dissolving 15 parts of $MoO_3$ in an aqueous ammonical solution composed of 6.8 parts of water and 13.5 parts of (28% $NH_3$) $NH_4OH$, with stirring in a closed container to prevent the loss of ammonia. The solution had a density of 30° C. of 1.287.

The cobalt-containing solution was prepared by dissolving 11.6 parts of $Co(NO_3)_2 \cdot 6H_2O$ in 2.3 parts of water and added to 6.8 parts of ethylenediamine with stirring at a temperature in the range of 120–130° F. followed by cooling to approximately 100° F. with stirring and the addition of approximately 1 part of hydrogen peroxide (3% solution).

The solutions containing the molybdenum and cobalt salts were mixed and, upon test, showed a pH of 8.7. The mixed solution was then added to 112 parts of partially dehydrated alumina (approximately 50% alpha alumina monohydrate and 50% beta alumina trihydrate) and mulled for 30 minutes in a Lancaster mixer. The mulled material was auger extruded through a 1/8" die with the strands cut into approximately 1/4" lengths. The pellets were treated at 250° F. for three hours in flowing dry air and then calcined in air at 1050° F. for two hours. This material had a surface area of 308 m.$^2$/g. as determined by nitrogen adsorption, and had a composition of about 82% by weight alumina, 3% by weight CoO, 15% by weight $MoO_3$, and 0.02% by weight $Na_2O$; and had a bulk density of 0.7.

EXAMPLE II

The catalyst prepared above was utilized for the hydrotreating of a naphtha charge stock containing 18 volume percent olefins, 0.55 weight percent sulfur and 95 p.p.m. (parts per million) nitrogen as nitrogen compounds. Utilizing the operating conditions of 750° F., a pressure of 550 p.s.i.g., a space rate of 3 volumes of liquid to 1 volume of catalyst and a hydrogen to oil ratio of 3, it was found that desulfurization was substantially complete and nitrogen was reduced to less than 1 p.p.m. during an entire operating period substantially in excess of 300 hours.

Table I, below, demonstrates the improvement in nitrogen removal possible with the catalyst of this invention. The table, likewise, sets forth the desirable properties of high surface area and low bulk density of the new catalyst.

Table I.—*Comparison of nitrogen removal activity and physical properties of representative hydrotreating catalyst*

| Catalyst | Composition, Wt. Percent | | P.p.m. $N_2$, Avg. 300 Hrs.[1] | Surf. Area, m.$^2$/g. | Bulk Dens. kg./l. |
|---|---|---|---|---|---|
| | CoO | $MoO_3$ | | | |
| Comm. Cat. #1 | 2 | 8 | 10 | 190 | .97 |
| Comm. Cat. #2 | 3 | 10 | 6 | 162 | .96 |
| Comm. Cat. #3 | 3 | 15 | 1.5–2 | 229 | .79 |
| Cat. of Ex. 1 | 3 | 15 | 0.5–1 | 296 | .68 |

[1] Charge stock contained 95 p.p.m. nitrogen and 0.55 weight percent sulfur. Operating conditions were 750° F.; 550 pounds per square inch gauge pressure; space rate of 3 liquid volumes of oil per volume of catalyst per hour; and hydrogen to oil ratio of 3.

EXAMPLE III

The data presented in Table II demonstrates catalyst preparation in accordance with this invention, develops a high surface area in a manner and to a degree not apparently available through other methods of preparation.

Table II

| Sample | Surface Area, m.²/g. |
|---|---|
| #1—Alumina hydrate (50% α-mono and 50% β-tri) (Ign. loss 27%; surface area after 300° F. drying=249 m.²/g.) | (249) |
| #2—No. 1 above, water mixed, auger extruded; dried at 250° F.; calcined 1,050° F.—2 hrs. 100% air | 267 |
| #3—Pellets from #2 above; Co-moly impregnated; dried at 250° F.; calcined 900° F.—2 hrs. 100% air | 212 |
| #4—Alumina hydrate (#1); mulled with Co-moly solutions; (Co ex Co (CHO₂)₂·2·H₂O); extruded; dried at 250° F.; calcined 1,050° F.—2 hrs. 100% air | 308 |
| #5—Same as No. 4 except Co ex Co (NO₃)₂·6H₂O | 296 |

It is evident from the above data that desirably high surface area catalysts are developed when the catalyst is prepared in accordance with this invention.

The foregoing examples are illustrative of a general method of preparation and are not to be considered as limiting other than in connection with the general description. Obviously many modifications and variations of the invention hereinbefore set forth may be made without departing from the spirit and scope thereof, and, therefore, only such limitations should be imposed as are indicated in the appended claims.

What is claimed is:

1. The method of preparing improved hydrotreating catalysts comprising oxides of cobalt and molybdenum in association with alumina, which method comprises thoroughly admixing alumina hydrate powder with a basic aqueous solution containing molybdenum as ammonium molybdate and cobalt in a Werner-type complex of the highest valence state, said basic aqueous solution containing the equivalent of 1–4 weight percent CoO and 8–20 weight percent MoO₃ based on the final catalyst, said alumina hydrate comprising a mixture of between about 25 to 75% by weight alpha alumina monohydrate and 75 to 25% by weight beta alumina trihydrate, forming by said admixture an extrudable paste, extruding said paste into unit particles of desired size, and drying and calcining said particles.

2. The method in accordance with claim 1 wherein said basic solution has a pH in the range of 7.5 to 9.5.

3. The method in accordance with claim 1 wherein said cobalt complex is treated with hydrogen peroxide to said highest valence state.

4. The method of preparing improved hydrotreating catalysts comprising oxides of cobalt and molybdenum in association with alumina, which method comprises preparing an aqueous solution having a pH in the range of 8.5 to 9.0 of ammonium molybdate in an amount equivalent to approximately 15% by weight of MoO₃ of the final catalyst composition and a trivalent Werner-type cobalt complex in an amount equivalent to approximately 3% by weight of CoO of the final catalyst, thoroughly admixing said solution with hydrated alumina consisting of approximately equal amounts of alpha alumina monohydrate and beta alumina trihydrate, said hydrated alumina being in an amount equivalent to approximately 82% by weight of Al₂O₃ of the final catalyst, said thorough admixture comprising 30 to 40% water by weight, forming said thorough admixture into suitably sized particles, drying and calcining said particles to high surface area, active catalyst of low bulk density.

5. The method in accordance with claim 4 wherein said surface area is in excess of 250 square meters per gram.

6. Pelleted hydrotreating catalyst containing 79–91% alumina, 1–4% CoO and 8–20% MoO₃ all by weight and characterized by high surface area and stable, high activity prepared by extrusion of a paste composed of a mixture of hydrated alumina with an aqueous basic solution prepared from cobaltous salt, hydrogen peroxide and ammonium molybdate, said hydrated alumina consisting of 25 to 75% beta alumina trihydrate and the remainder being alpha alumina monohydrate; and calcination of the extruded material.

References Cited in the file of this patent

UNITED STATES PATENTS

| 2,296,406 | Spicer | Sept. 22, 1942 |
| 2,331,292 | Archibald | Oct. 12, 1943 |
| 2,422,372 | Smith | June 17, 1947 |
| 2,755,257 | Donovan | July 17, 1956 |